L. I. AND M. Z. RYDER.
DIRIGIBLE LIGHT.
APPLICATION FILED OCT. 31, 1919.

1,352,993.

Patented Sept. 14, 1920.
2 SHEETS—SHEET 1.

L. I. AND M. Z. RYDER.
DIRIGIBLE LIGHT.
APPLICATION FILED OCT. 31, 1919.

1,352,993.

Patented Sept. 14, 1920.
2 SHEETS—SHEET 2.

Inventor
L. I. Ryder and
M. Z. Ryder
By Franklin H. Hough
Attorney

UNITED STATES PATENT OFFICE.

LINUS I. RYDER AND MARY Z. RYDER, OF BRIARCLIFF MANOR, NEW YORK.

DIRIGIBLE LIGHT.

1,352,993.  Specification of Letters Patent.  Patented Sept. 14, 1920.

Application filed October 31, 1919. Serial No. 334,881.

*To all whom it may concern:*

Be it known that we, LINUS I. RYDER and MARY Z. RYDER, citizens of the United States, residing at Briarcliff Manor, in the county of Westchester and State of New York, have invented certain new and useful Improvements in Dirigible Lights; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dirigible lights for automobiles, and relates especially to a manually operated device for operating the lights in connection with the steering gear of an automobile.

The present invention comprises a simple and efficient device of this nature having various details of construction, combination and arrangement of parts which will be hereinafter fully described, shown in the accompanying drawings and then specifically defined in the appended claim.

Our invention is illustrated in the accompanying drawings which, with the numerals of reference marked thereon, form a part of this application, and in which.

Figure 1:
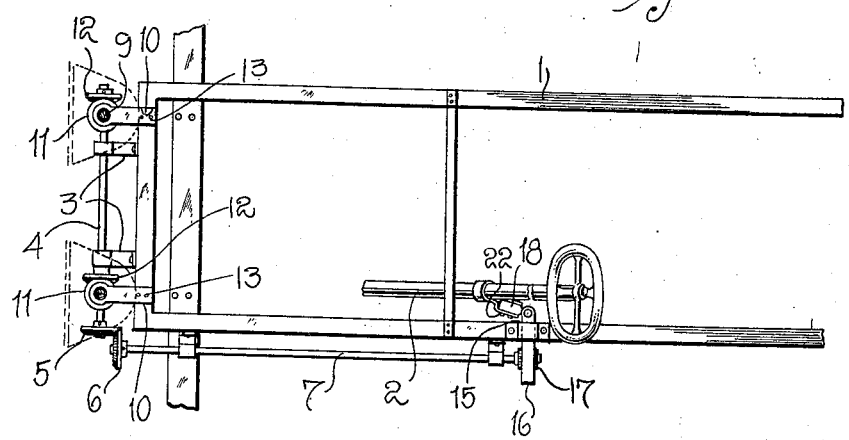
Figure 1 is a top plan view.
Figure 2:
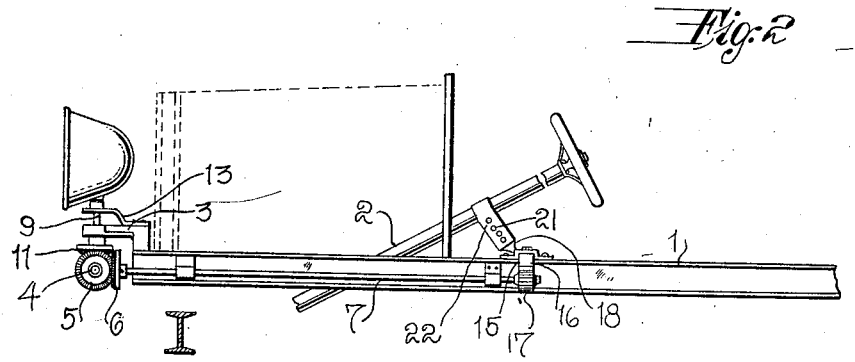
Fig. 2 is a side elevation.
Figure 3:
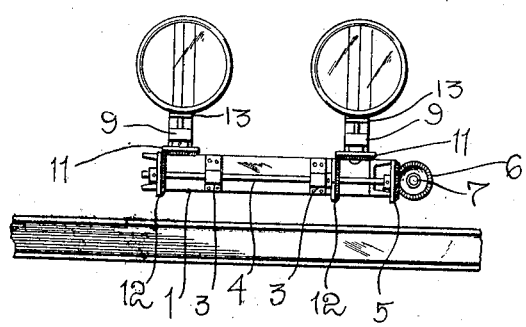
Fig. 3 is an end view.
Figure 4:
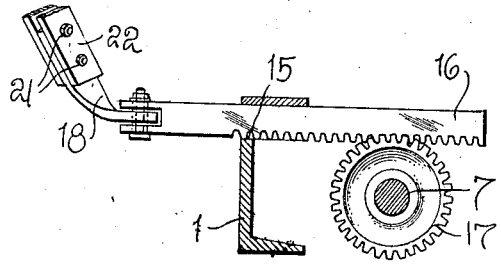
Fig. 4 is a fragmentary view, partly in section, of a portion of the operating mechanism.

Reference now being had to the details of the drawings by numerals:

1 designates the chassis of an automobile and 2 the steering post of the usual construction. Mounted in suitable bearings in the brackets 3, projecting from the forward end of the chassis, is a shaft 4 having a bevel gear 5 keyed to one end which is in mesh with a similar gear 6 fixed to the shaft 7 which is journaled in suitable bearings upon the brackets projecting from the side of the chassis. Lamp brackets 9 are journaled in the forwardly projecting arms 10 which are fastened to the chassis and bevel gear wheels 11 are secured one to the lower end of each of said brackets.

Bevel gears 12 are keyed to the shaft 4 and are in mesh with the gears 11. Leaf springs 13 are fastened at their rear ends to the arms 10 and are apertured to receive the lamp brackets in which they are journaled, said springs being adapted to take up vibration of the lamps carried by the brackets.

One side of the chassis has a transverse groove or channel 15, and 16 is a rack bar having a longitudinal movement in said groove or channel, and the teeth of said rack bar are adapted to mesh with the teeth of the pinion 17 fixed to the shaft 7. The inner end of the rack bar is slotted, and 18 is a link having a bent end pivotally mounted in the slot in the rack bar, and its other end adjustably held between the free ends of a strap or clamping member 22 by fastening means 21 passing through registering apertures in said link and strap. The strap is bent centrally of the length thereof around the steering post 2, and is frictionally clamped thereto against rotation independent thereof.

In operation, it will be noted that when steering for turning in one direction or the other in the usual way, a similar movement will be imparted to the lamps by the connections shown and described, thus insuring the turning of the lamps so that the rays of light will always illuminate the road in advance of the automobile.

What we claim to be new is:

A dirigible light, and means for turning the same, including a chassis frame provided with a channel in the side, a pair of journals mounted within said channel, a shaft extending longitudinally of said frame and mounted in said journals, a yoke mounted on top of said channel, a pinion mounted on the end of said shaft, a rack slidable through said yoke at an angle to said shaft, engageable with said pinion, and means mounted upon the steering post for moving said rack.

In testimony whereof we hereunto affix our signatures.

LINUS I. RYDER.
MARY Z. RYDER.